United States Patent [19]

Lamminen et al.

[11] Patent Number: 5,020,556

[45] Date of Patent: Jun. 4, 1991

[54] VEHICLE WASH APPARATUS WITH SPINNING NOZZLES

[75] Inventors: Olli Lamminen, Ann Arbor; Erkki A. Koivunen, Livonia, both of Mich.

[73] Assignee: 501 Peerless Pump Company, Egan, Minn.

[21] Appl. No.: 466,991

[22] Filed: Jan. 18, 1990

[51] Int. Cl.$^5$ ............................ B60S 3/04; B05B 3/06
[52] U.S. Cl. ................................ 134/112; 134/102; 134/123; 134/179; 239/252; 239/256; 239/428.5
[58] Field of Search ............... 134/102, 112, 123, 179; 239/252, 256, 428.5

[56] References Cited

U.S. PATENT DOCUMENTS

| | | | |
|---|---|---|---|
| 1,950,712 | 3/1934 | Coles et al. | 239/252 |
| 2,108,787 | 2/1938 | Coles et al. | 239/252 X |
| 2,865,672 | 12/1958 | Guinard | 239/252 |
| 2,985,384 | 5/1961 | Martin | 239/428.5 X |
| 3,052,574 | 9/1962 | Kennedy, Jr. | 134/179 X |
| 3,409,030 | 11/1968 | Schmidt | 134/179 X |
| 3,529,611 | 9/1970 | Daum et al. | 134/179 X |
| 3,593,730 | 7/1971 | Burchett | 134/179 X |
| 4,440,345 | 4/1984 | Figwer et al. | 239/252 X |
| 4,801,090 | 1/1989 | Yoshida et al. | 239/428.5 X |

FOREIGN PATENT DOCUMENTS 623780  5/1949  United Kingdom ............... 239/252

*Primary Examiner*—Philip R. Coe
*Attorney, Agent, or Firm*—Harness, Dickey & Pierce

[57] ABSTRACT

A vehicle wash system is disclosed which consists of an arch through which a vehicle can be moved. A plurality of spinning nozzle assemblies are attached to the arch each having a number of nozzle outlets for directing the water to the vehicle surface to remove dirt, salt, etc. in which only water impacts the vehicle. The nozzles are oriented so as to create a rotational moment to spin the nozzles relative to the nozzle assembly. An oil pump is contained within the assembly to provide a resistance to rotation to regulate the speed of nozzle rotation. Each water nozzle includes an air nozzle to form a sheath of air around each water jet to maintain the integrity of the water jet to maximize the water jet impact force with the vehicle surface.

9 Claims, 3 Drawing Sheets

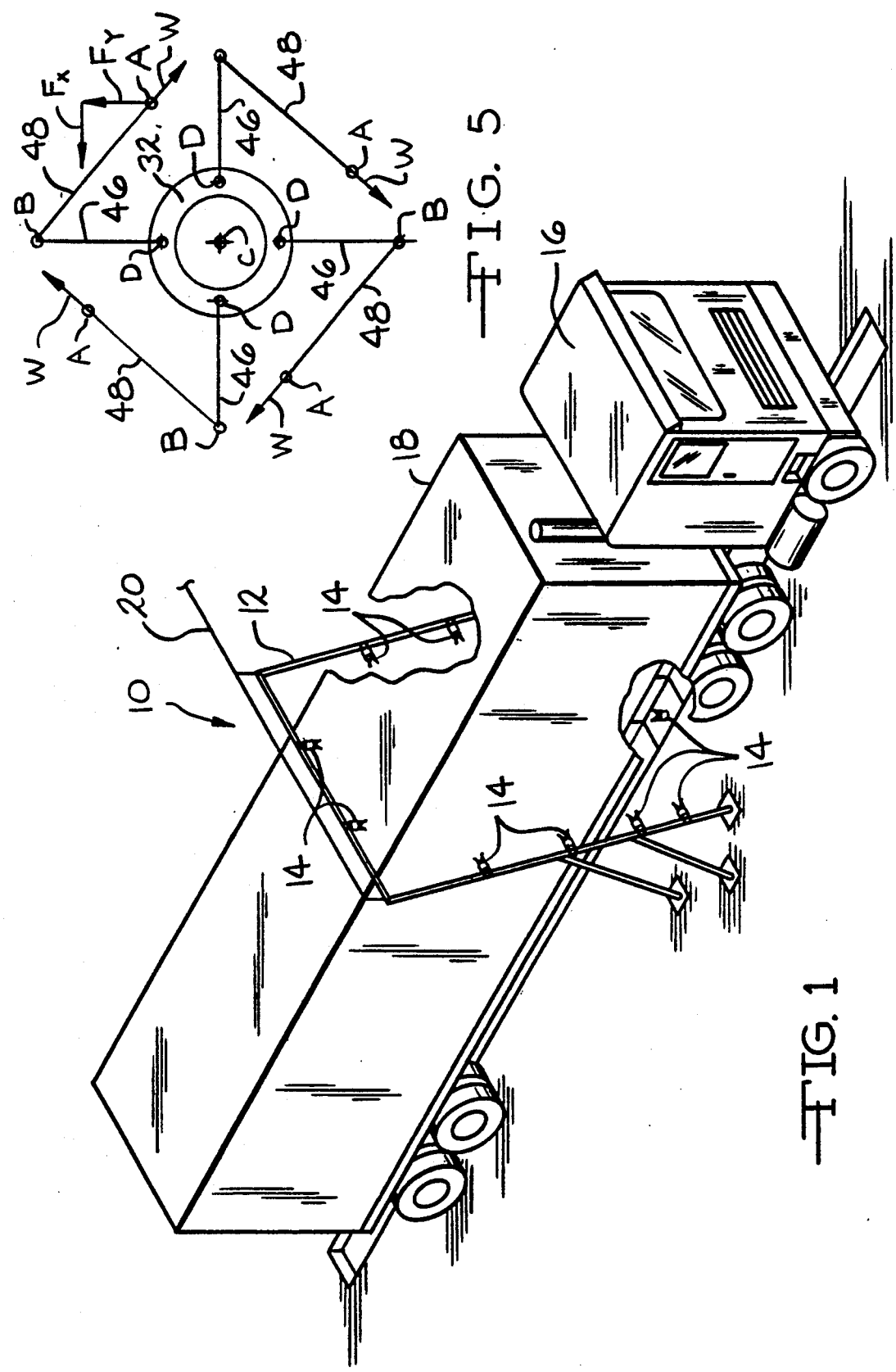

VEHICLE WASH APPARATUS WITH SPINNING NOZZLES

BACKGROUND OF THE INVENTION

The present invention relates to a vehicle wash apparatus and in particular to a wash apparatus containing spinning nozzle assemblies for use in cleaning vehicles, particularly large vehicles, in a "touchless wash system" wherein no brushes, etc. contact the vehicle surface.

Two methods are typically used in cleaning motor vehicles. One method involves the use of rags, brushes, etc. to scrub the vehicle surface to remove dirt, salt, etc. The scrubbing can often damage the vehicle surface by scratching or otherwise marring the surface finish. In addition, a complex wash apparatus is required to scrub large vehicles such as tractor-trailer trucks. Because of the many different sizes and shapes of trucks, it is also difficult to develop one apparatus that can thoroughly clean all trucks.

The other method used to clean vehicles is a so called touchless method that utilizes high water pressure to remove the dirt and salt from the vehicle. Many touchless wash systems utilize a manually held water nozzle at the end of a wand. This enables the user to move the nozzle along the vehicle surface, in close proximity to the vehicle, to fully utilize the water pressure in cleaning the vehicle and to ensure that the entire vehicle surface is cleaned. It is necessary to keep the nozzle close to the vehicle to prevent pressure loss in the water between the nozzle and the vehicle. As a result, only a relatively small surface area can be sprayed at a given time by the nozzle. By being a manual device, it is time consuming to use in cleaning a truck.

It is the object of this invention, therefore, to provide a touchless wash system to clean large vehicles quickly and effectively.

It is a further object of this invention to provide a wash system with nozzles mounted to a fixed structure rather than to use hand held nozzles.

It is another object of the invention to provide a system that is capable of cleaning vehicles of various sizes.

It is a still further object of the invention to provide a system having nozzles which cover large areas of the vehicle surface and still maintain sufficient water pressure to thoroughly clean the vehicle.

The wash apparatus of the present invention includes an arch structure supporting a number of spinning nozzle assemblies. Each nozzle assembly includes one or more water outlet nozzles which are rotatably mounted to the assembly housing. Rotation of the nozzles about the axis of the nozzle assembly enables each nozzle to cover larger surface areas of the vehicle. The nozzles are directed so that the water jet is at an angle to the axis of rotation such that the reaction force of the water spray jet on a nozzle provides the driving forces to cause rotation. The reaction force creates a moment about the nozzle assembly axis to cause the rotation.

Each nozzle assembly includes an internal hydraulic pump mechanism which is used to restrict the maximum rotational speed of the nozzles by pumping oil through a circulating path within the nozzle assembly. The oil circulation path includes an adjustable flow restrictor such that the braking force of the hydraulic pump can be varied to adjust the maximum speed of nozzle rotation. The circulating oil is further used to lubricate the bearings within the nozzle assembly.

Each water nozzle is surrounded by an air nozzle having peripheral air vents to draw air into the nozzles. The air forms a sheath of high velocity air surrounding the water jet. The air sheath is used to maintain the integrity of the water jet stream as the water travels from the nozzle to the vehicle surface so as to maximize the water jet impacting force with the vehicle surface. This enables the distance between the nozzle and vehicle surface to be increased without reducing the performance of the wash system.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view showing the vehicle wash apparatus of this invention with a vehicle passing therethrough;

FIG. 5 is a schematic end view of the nozzle assembly illustrating the reaction forces acting on the nozzles to cause rotation.

DETAILED DESCRIPTION OF THE PREFERRED EMBODIMENT

Figure 3:
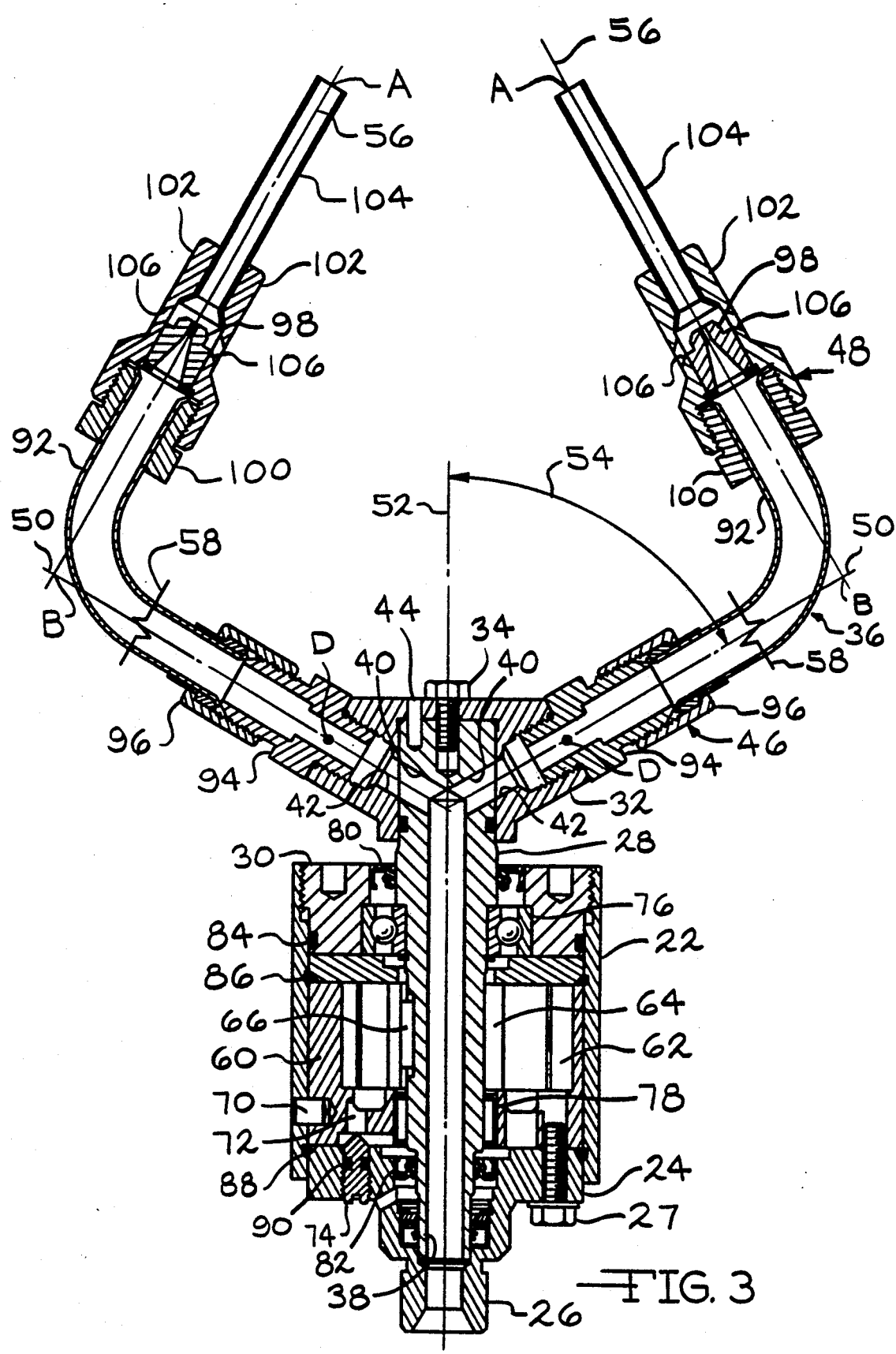
FIG. 3 is a sectional view of the spinning nozzle assembly of this invention.
Figure 2:
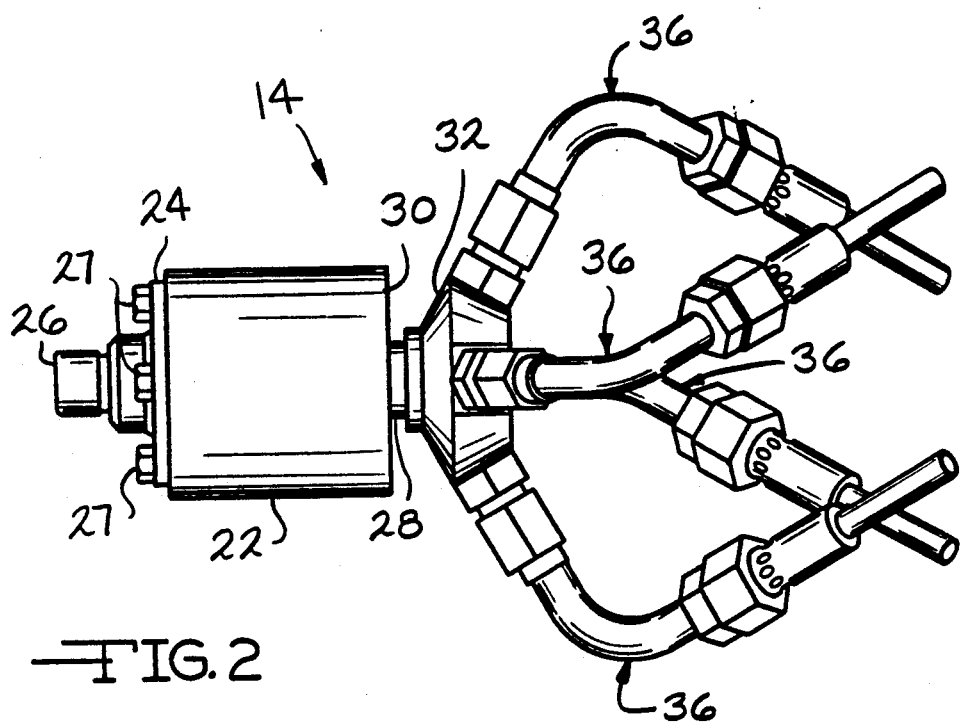
FIG. 2 is an elevational view of a spinning nozzle assembly of this invention.
Figure 4:
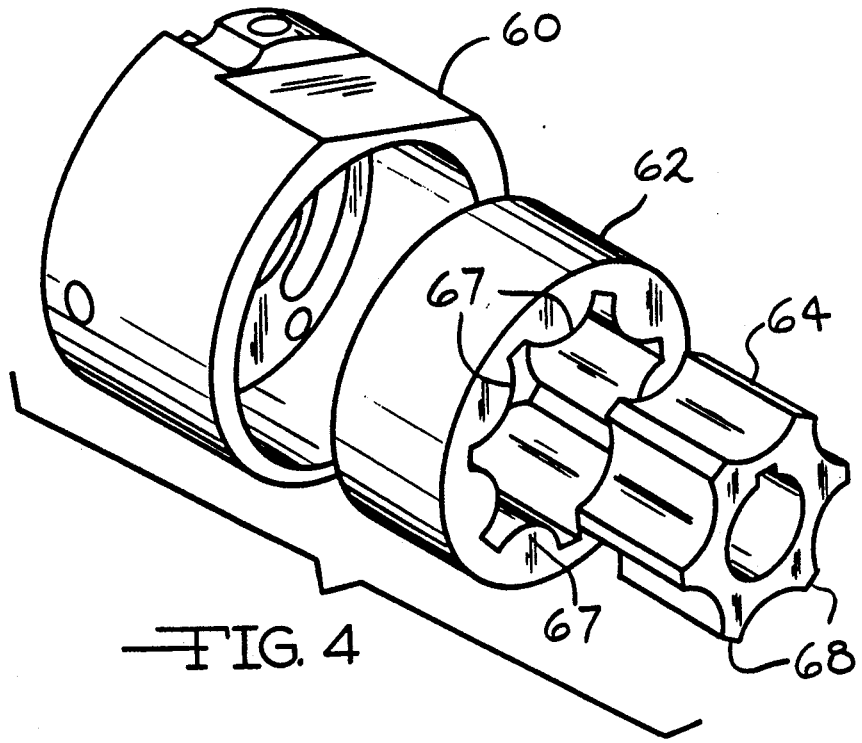
FIG. 4 is an exploded perspective view of the hydraulic pump components within the nozzle assembly.

The vehicle wash apparatus of this invention, containing a plurality of spinning nozzle assemblies, is shown in FIG. 1 and designated generally at 10. Apparatus 10 includes an arch 12 having a plurality of spinning nozzle assemblies 14 attached thereto. The arch is of a size suitable for a vehicle to be washed, in this case tractor 16 and trailer 18, to pass through the arch. The spinning nozzle assemblies 14 on the arch will direct water to the sides and top of the vehicle as well as the front and rear as will be described below. An additional nozzle assembly 14 is placed beneath the vehicle to wash the underside thereof. Wash water is supplied to the arch 12 by a conduit 20 which travels through the arch and is connected to the nozzle assemblies 14. The opposite end of conduit 20 is coupled to a high pressure wash water source as is well known in the vehicle wash art. The wash water is preferably supplied at a pressure of approximately 400 psi.

Assembly 14 includes a shell 22 and a rear cover 24. Cover 24 is integrally formed with a fitting 26 to mount the nozzle assembly to the arch 12 and to couple the nozzle assembly to the water conduit 20. Rear cover 24 is attached to the nozzle assembly with bolts 27. A hollow shaft 28 extends through shell 22 and outward past the front end 30 of shell 22. A hub 32 is coupled to the end of shaft 28 by bolt 34.

Hollow shaft 28 forms a passage 38 for wash water to flow through. The end of the shaft 28 coupled to hub 32 includes four apertures 40 extending outwardly at an angle relative to the shaft axis 52. Hub 32 includes corresponding apertures 42 which are aligned with the shaft apertures by pin 44.

Four outlet conduits 36 extend from hub 32 and include a first portion 46 forming a continuation of the apertures 40 and 42. The axis 50 of the outlet conduit first portion and the apertures 40 and 42 are at a 60° angle to the longitudinal axis 52 of shaft 28 as shown by angle 54. The second portion 48 of outlet conduits 36 has an axis 56 at an angle relative to the first portion of the conduit such that the outlet conduits are directed inwardly, back toward the axis 52. However, the outlet conduits 36 are rotated about the axis 50 such that the water jets exiting from the outlet conduits do not intersect the axis 52. The second portion 48 of the conduit is shown in its true length in FIG. 3 as indicated by break lines 58.

By rotating each of the outlet conduits 36 about their respective axis 50, the reaction force acting on the outlet conduits from the water jet combine to create a moment about axis 52 to rotate shaft 28 causing the outlet conduits to rotate.

Nozzle assembly 14 includes a gerotor pump comprised of a rotor housing 60, a gear rotor 62 and a drive rotor or gerotor element 64. Drive rotor 64 is coupled to shaft 28 by key 66 for rotation with the shaft 28. The gear rotor 62 is eccentric relative to the shaft 28. The drive rotor 64 carries the gear rotor 62 around in mesh. Pumping chambers are formed between the lobes 67 of the gear rotor and the tips 68 of the drive rotor. Rotor housing 60 is fixed within shell 22 by a plurality of dowels 70.

The gerotor pump circulates oil through the nozzle assembly to provide a load on the rotating shaft to restrict the rotational speed of the shaft 28. The size of the gerotor pump outlet passage 72 can be varied by the set screw 74 accessible from the exterior of the nozzle assembly 14. By adjusting the size of the pump outlet passage, the resistance on the shaft can be varied, thereby adjusting the peak rotational speed of shaft 28. The size of the outlet passage and the water pressure determine the shaft rotation speed.

Shaft 28 is rotatably mounted in assembly 14 by ball bearing 76 and needle bearing 78. Oil seals 80 and 82 are provided to seal against the rotating shaft 28 to contain the hydraulic oil within the shell 22. O-ring seals 84, 86, and 88 prevent oil leakage between stationary components within the assembly and o-ring 90 prevents oil leakage past the set screw 74.

FIG. 5 is a schematic end view of the outlet conduits 36. The segment A-B represents the second conduit portion 48 between the point B of the intersection of axis 50 with axis 56 and the point A at the conduit outlet end. Point C is the intersection of axis 50 and axis 52. Point D is the intersection of conduit 36 with hub 32. The water is discharged in the direction of arrow W. The reaction force of the water jet exiting the nozzles is shown in its X and Y components as arrows $F_x$ and $F_y$. Both of these force components are lying in plain perpendicular to the shaft axis 52 and create a counter clockwise moment about axis 52 so as to rotate shaft 28. FIG. 5 only illustrates two components of the water jet reaction force. Because the water jet is directed through three dimensional space, there is a third reaction force component not shown in FIG. 5. This third component results from the water jet being directed out of the plane of the paper.

As a result of the water jets being directed at an angle to the nozzle assembly axis, during a portion of the nozzle's rotation, the water jet travels in a rearward direction relative to the vehicle being washed. This enables the wash apparatus to clean the front surface of an approaching vehicle. Likewise, during the opposite portion of nozzle rotation the water jet travels in a forward direction relative to the vehicle. This enables the rear surface of the vehicle to be washed as the vehicle moves away from arch 12.

The outlet conduits 36 include an outlet tube 92 coupled to the hub 32 by a connector 94 and fitting 96. The outlet tube 92 terminates at a water nozzle 98 held in place by a fitting 100 and air nozzle body 102. Air nozzle body 102 and air nozzle tub 104 form a sheath of air to surround the water jet from water nozzle 98. Air is drawn into the air nozzle through apertures 106 in the air nozzle body. The air sheath moves at a high velocity along with the water jet to surround the water jet and maintain its integrity as the water travels from the nozzle to the vehicle surface. By maintaining the water jet integrity, the distance between the nozzle and vehicle can be increased and maintain a sufficient water impact force to remove dirt, etc. This enables the water jets to be spaced further from the vehicle allowing the water jets to diverge further apart to cover a larger surface area.

The axis 52 of each nozzle assembly 14 on arch 12 is directed toward the vehicle. Each of the four nozzles from each assembly however, are oriented in a different direction such that as the nozzles spin, a large surface area of the vehicle is covered by the four water jets.

The wash apparatus of the present invention including the spinning nozzle assemblies meets the objective of the present invention of providing a touchless wash system to clean large vehicles quickly and effectively. The system includes nozzles mounted to an arch structure through which the vehicle moved. This enables automation of the wash system by eliminating manually held nozzle wands. The nozzles cover relatively large areas of the vehicle surface due to the spinning nozzle structure. By maintaining the water jet integrity over a large distance with an air sheath, the wash system can clean vehicles of various sizes whether the vehicle surface is close to or far from the nozzle.

It is to be understood that the invention is not limited to the exact construction illustrated and described above, but that various changes and modifications may be made without departing from the spirit and scope of the invention as defined in the following claims.

We claim:

1. A water nozzle assembly, comprising:
   a stationary nozzle housing having an axis;
   a hollow shaft disposed axial within said housing forming water flow conduit therethrough with one end of said shaft extending from a first axial end of said housing;
   a pair of axially spaced bearings supporting said shaft for rotation about said axis;
   water inlet means for receiving pressurized water at a second axial end of said housing, said inlet communicating with said water flow conduit;
   means coupled to said one end of said shaft forming at least one water nozzle creating a water jet of said pressurized water as said water exits said nozzle assembly, said at least one nozzle having an outlet oriented relative to said axis so that water reaction forces acting on said at least one nozzle creates a moment about said axis;
   said housing forming an oil chamber surrounding said shaft with said bearings disposed in said oil chamber whereby oil in said chamber lubricates said bearings; and brake means for controlling the rotational speed of said shaft, said brake means including a pump for circulating oil in said chamber.

2. The assembly of claim 1 further comprising means for varying the rotational speed of said shaft.

3. The assembly of claim 2 wherein said varying means includes a restricted passage through which oil is circulated and a set screw accessible from the exterior of said housing for adjusting the cross sectional area of said restricted passage.

4. The assembly of claim 3 wherein said pump includes a drive rotor coupled to and concentric about said shaft, an eccentric gear rotor in mesh with said drive rotor and carried for rotation within a rotor housing fixed to said nozzle housing.

5. The assembly of claim 1 further comprising means forming a sheath of air surrounding said water jet as said jet exits said at least one nozzle.

6. The assembly of claim 5 wherein said sheath forming means includes an air nozzle surrounding said at least one water nozzle having a plurality of air inlet openings through which air is drawn into said nozzle by said water jet.

7. A wash system for cleaning a motor vehicle with pressurized water, comprising:

a plurality of water nozzle assemblies for directing pressurized wash water toward said vehicle, said nozzle assemblies each having a stationary nozzle housing having an axis, a hollow shaft disposed axial within said nozzle housing forming a water flow conduit therethrough with one end of said shaft extending from a first axial end of said nozzle housing, a pair of axially spaced bearings supporting said shaft for rotation about said axis, water inlet means for receiving pressurized water at a second axial end of said nozzle having, said inlet communicating with said water flow conduit, means coupled to said one end of said shaft forming at least one water nozzle creating a water jet of said pressurized water as said water exits said nozzle assembly, said at least one nozzle having an outlet oriented relative to said axis so that water reaction forces acting on said at least one nozzle creates a moment about said axis, said nozzle housing forming an oil chamber surrounding said shaft with said bearings disposed in said oil chamber whereby oil in said chamber lubricates said bearings;

brake means for controlling the rotational speed of said shaft, said brake means including a pump circulating said in said chamber; and means forming a raised arch structure for the vehicle to be passed through with said nozzle assemblies supported thereon.

8. The apparatus of claim 7 further comprising means within said housing for varying the rotational speed of said shaft.

9. The apparatus of claim 8 wherein said varying means includes a restricted passage through which oil in said chamber is circulated and a set screw accessible from the exterior of said nozzle housing for adjusting the cross sectional area of said restricted passage.

* * * * *